US008479251B2

(12) United States Patent
Feinleib et al.

(10) Patent No.: US 8,479,251 B2
(45) Date of Patent: Jul. 2, 2013

(54) SYSTEM AND METHOD FOR SYNCHRONIZING STREAMING CONTENT WITH ENHANCING CONTENT USING PRE-ANNOUNCED TRIGGERS

(75) Inventors: David A. Feinleib, Kirkland, WA (US); Isaac A. Sheldon, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 2017 days.

(21) Appl. No.: 10/933,623

(22) Filed: Sep. 3, 2004

(65) Prior Publication Data
US 2005/0028195 A1 Feb. 3, 2005

Related U.S. Application Data

(63) Continuation of application No. 09/282,285, filed on Mar. 31, 1999, now abandoned.

(51) Int. Cl.
| | |
|---|---|
| H04N 7/16 | (2011.01) |
| H04N 7/173 | (2011.01) |
| G06F 3/00 | (2006.01) |
| G06F 15/16 | (2006.01) |

(52) U.S. Cl.
USPC ............ 725/136; 725/37; 725/109; 709/217; 709/218; 709/219

(58) Field of Classification Search
USPC .......................................... 725/32, 114, 135
See application file for complete search history.

(56) References Cited

U.S. PATENT DOCUMENTS 4,531,021 A  7/1985 Bluestein et al.
4,736,422 A  4/1988 Mason (Continued)

FOREIGN PATENT DOCUMENTS

| WO | WO 98/53611 | 11/1998 |
|---|---|---|
| WO | WO 9853611 A1 * | 11/1998 |
| WO | WO 99/66719 | 12/1999 |

OTHER PUBLICATIONS

M2Presswire, "The Thompson Partnership: New! TurboSFX v2.0—File Compression and Installer Software", Aug. 1998.*

(Continued)

Primary Examiner — Chris Parry
Assistant Examiner — James Marandi
(74) Attorney, Agent, or Firm — Lee & Hayes, PLLC

(57) ABSTRACT

A client-server architecture synchronizes streaming content with enhancing content via pre-announced triggers. The architecture includes server-based components to generate announcements containing information specifying how and when to receive upcoming triggers that will be transmitted at a later time. The server transmits the announcements to a general broadcast or multicast IP address. Client-based components monitor the IP address to receive and filter the announcements. Selected announcements are stored in a guide database in correlation with the streaming content programs to indicate that the programs are interactive. When a user tunes to an interactive program, the client opens a container HTML page that contains controls to receive the streaming content program and to extract the announcements from the guide database. The latter control monitors the IP address at the times specified in the selected announcements to receive the triggers corresponding to the interactive program. The server delivers the triggers at times synchronized to the streaming content. When triggers arrive, the client control processes the triggers to coordinate presentation of the enhancing content with the streaming content program. The triggers may further be used to carry items that fill a ticker being displayed with the program.

35 Claims, 5 Drawing Sheets

U.S. PATENT DOCUMENTS

| | | | |
|---|---|---|---|
| 4,769,818 A | 9/1988 | Mortimer | |
| 5,029,207 A | 7/1991 | Gammie | |
| 5,187,787 A * | 2/1993 | Skeen et al. | 719/314 |
| 5,231,631 A | 7/1993 | Buhrke et al. | |
| 5,257,369 A * | 10/1993 | Skeen et al. | 719/312 |
| 5,335,277 A | 8/1994 | Harvey et al. | |
| 5,339,392 A * | 8/1994 | Risberg et al. | 715/762 |
| 5,359,367 A | 10/1994 | Stockill | |
| 5,499,243 A | 3/1996 | Hall | |
| 5,539,743 A | 7/1996 | Amemiya et al. | |
| 5,559,808 A | 9/1996 | Kostreski et al. | |
| 5,565,909 A | 10/1996 | Thibadeau et al. | |
| 5,570,126 A | 10/1996 | Blahut et al. | |
| 5,586,186 A | 12/1996 | Yuval et al. | |
| 5,589,892 A | 12/1996 | Knee et al. | |
| 5,592,552 A | 1/1997 | Fiat | |
| 5,594,509 A | 1/1997 | Florin et al. | |
| 5,617,565 A | 4/1997 | Augenbraun et al. | |
| 5,619,250 A | 4/1997 | McClellan et al. | |
| 5,625,692 A | 4/1997 | Herzberg et al. | |
| 5,625,864 A | 4/1997 | Budow et al. | |
| 5,627,829 A | 5/1997 | Gleeson et al. | |
| 5,650,831 A | 7/1997 | Farwell | |
| 5,666,293 A | 9/1997 | Metz et al. | |
| 5,675,390 A | 10/1997 | Schindler et al. | |
| 5,684,807 A | 11/1997 | Bianchini et al. | |
| 5,686,954 A | 11/1997 | Yoshinobu et al. | |
| 5,687,331 A | 11/1997 | Volk et al. | |
| 5,689,081 A | 11/1997 | Tsurumi | |
| 5,694,163 A | 12/1997 | Harrison | |
| 5,706,048 A | 1/1998 | Davis | |
| 5,708,845 A | 1/1998 | Wistendahl | |
| 5,724,424 A | 3/1998 | Gifford | |
| 5,727,065 A * | 3/1998 | Dillon | 705/52 |
| 5,727,865 A | 3/1998 | Caldwell | |
| 5,751,282 A | 5/1998 | Girard et al. | |
| 5,761,608 A | 6/1998 | Wolzlen et al. | |
| 5,774,664 A | 6/1998 | Hidary et al. | |
| 5,774,666 A | 6/1998 | Portuesi | |
| 5,778,187 A | 7/1998 | Monteiro et al. | |
| 5,799,002 A | 8/1998 | Krishnan | |
| 5,801,753 A | 9/1998 | Eyer et al. | |
| 5,809,543 A | 9/1998 | Byers et al. | |
| 5,818,441 A | 10/1998 | Throckmorton et al. | |
| 5,818,841 A * | 10/1998 | Shen | 370/395.21 |
| 5,818,935 A | 10/1998 | Maa | |
| 5,835,914 A * | 11/1998 | Brim | 707/206 |
| 5,838,668 A | 11/1998 | Okada et al. | |
| 5,854,897 A | 12/1998 | Radziewicz et al. | |
| 5,859,852 A | 1/1999 | Moura et al. | |
| 5,878,033 A | 3/1999 | Mouly | |
| 5,884,033 A | 3/1999 | Duvall et al. | |
| 5,889,860 A | 3/1999 | Eller et al. | |
| 5,929,849 A | 7/1999 | Kikinis | |
| 5,940,073 A | 8/1999 | Klosterman et al. | |
| 5,978,828 A * | 11/1999 | Greer et al. | 709/224 |
| 6,006,256 A * | 12/1999 | Zdepski et al. | 725/114 |
| 6,029,045 A | 2/2000 | Picco et al. | |
| 6,049,671 A | 4/2000 | Slivka et al. | |
| 6,064,420 A | 5/2000 | Harrison et al. | |
| 6,091,411 A * | 7/2000 | Straub et al. | 715/747 |
| 6,108,706 A * | 8/2000 | Birdwell et al. | 709/229 |
| 6,141,010 A | 10/2000 | Hoyle | |
| 6,177,931 B1 | 1/2001 | Alexander et al. | |
| 6,205,485 B1 | 3/2001 | Kikinis | |
| 6,209,132 B1 | 3/2001 | Harrison et al. | |
| 6,216,141 B1 | 4/2001 | Straub et al. | |
| 6,233,734 B1 | 5/2001 | Macrae et al. | |
| 6,240,555 B1 * | 5/2001 | Shoff et al. | 725/110 |
| 6,263,505 B1 | 7/2001 | Walker et al. | |
| 6,298,482 B1 | 10/2001 | Seidman et al. | |
| 6,421,694 B1 * | 7/2002 | Nawaz et al. | 715/234 |
| 6,427,238 B1 | 7/2002 | Goodman et al. | |
| 6,438,751 B1 | 8/2002 | Voyticky et al. | |
| 6,502,243 B1 | 12/2002 | Thomas | |
| 6,536,041 B1 * | 3/2003 | Knudson et al. | 725/39 |
| 6,604,242 B1 | 8/2003 | Weinstein et al. | |
| 6,637,032 B1 | 10/2003 | Feinleib | |
| 6,763,522 B1 | 7/2004 | Kondo et al. | |
| 7,079,176 B1 * | 7/2006 | Freeman et al. | 348/207.1 |
| 2001/0014914 A1 | 8/2001 | Muramatsu et al. | |
| 2002/0069113 A1 * | 6/2002 | Stern | 705/26 |

OTHER PUBLICATIONS

W3C, "HTML 4.0 Specification", REC-html40-19980424.*
Advanced Television Enhancement Forum Specification (AVTEF), Draft Version 1.1r26, Feb. 2, 1999.*
Chor, B. et al., "Tracing Traitors", Proceedings of CRYPTO 1994 (Springer Verlag, 1994) pp. 259-270.
Panabaker et al., "The Transmission of IP Over the Vertical Blanking Interval of a Television Signal" Internet Reference, http://www.microsoft.com, 1997.
Lixia Zhang et al., "RSVP; A New Resource Reservation Protocol" IEEE Network Magazine, Sep. 1993.
The MBone Session Agenda http://www.cilea.it/MBone/agenda.html. No Date.
Kashpureff.ORG Network information Center, "Search-Internet Drafts," @ www.kashpureff.org.
VRML 97 Mbone Broadcast Announcement Rem-Conf Archieve, Feb. 1997.
Mbone Web Site http://www.mbone.com, No Date.
Advanced Television Enhancement Forum Specification (ATVEF)-2-1999 (pp. 1-37).
The Intercast Industry Group, "Combining television and the Internet on the PC", Graphic Media, Inc.
Berniker, Mark "TV Guide going online," Broadcasting and Cable, Jun. 13, 1994.

* cited by examiner

SYSTEM AND METHOD FOR SYNCHRONIZING STREAMING CONTENT WITH ENHANCING CONTENT USING PRE-ANNOUNCED TRIGGERS

RELATED APPLICATIONS

The present application claims priority under 35 U.S.C. §120 as a continuing application of U.S. patent application Ser. No. 09/282,285 to Feinleib et al., which was filed Mar. 31, 1999 and is hereby incorporated by reference in its entirety.

TECHNICAL FIELD

This invention relates to a system and method for synchronizing streaming content with enhancing content. More particularly, this invention relates to a system that announces transmission of upcoming enhancing content that is to be associated with the streaming content, such as video or a television signal. The system further encompasses timely reception of the enhancing content and displaying it in conjunction with the streaming content through use of triggers.

BACKGROUND

Video content programs, such as TV shows and pay-per-view movies, are delivered to a viewer as a continuous data stream. Programs are most commonly distributed using a wireless broadcast system or a cable system. In the first instance, the programs are broadcast over a wireless network and received at individual homes through an antenna or satellite dish. In the latter case, the programs are transmitted over cable to set-top boxes resident in the viewers' homes.

In traditional broadcast distribution systems, there is no opportunity for interactive control of the content by the viewer. The viewer simply has an option to watch the program, change to a different program, or turn off the television. However, as consumers have learned from playing video games on their televisions, non-interactive viewing is not nearly as fun or sensory rich as interactive entertainment.

To enhance the traditional way of viewing television, there has been some effort toward the production of interactive programming content. As presently contemplated, additional interactive content is created to enhance the existing traditional program. This supplemental content is played along with the continuous video stream to enable viewers to interact with the program in a more involved manner than simply watching it. The supplemental content might, for example, ask the viewer questions about the episode, or play games with the viewer that relate to the show, or describe behind-the-scenes aspects of making the program, or provide links to stores that sell merchandise sponsored by the show. In addition, the content may not be tied to a particular program, but instead be used to convey general information, such as tickers for news headlines, weather information, sports scores, and so forth.

The Internet is rapidly emerging as a means for supplying interactive content. Resources available on the Internet are most commonly presented as HTML (hypertext markup language) pages. Users can browse through pages of information via the World Wide Web ("Web") and receive multimedia-like experiences with video, audio, images, text, and other multimedia rich resources. Newer technologies are coming the television and Internet experiences to provide interactive content. Set-top boxes, for example, are being configured to support Web browsers that enable access to Web content in addition to receiving traditional television signals. As an example, WebTV Networks, Inc. manufactures and sells a browser-based set-top box (STB) having a television tuner, a browser, and a standard network interface device that enables simultaneous viewing of both television programs and web programming.

Newer generations of personal computers (PCs) are being implemented with broadcast reception capabilities, allowing them to receive and display television signals. Such PCs are equipped with a television tuner and software for television reception. A Windows-brand operating system from Microsoft Corporation, for example, includes software that supports a number of interactive services and reception of broadcast data and content feeds.

These newer interactive television technologies combine the power of traditional television with the compelling interactivity of the Internet. One common approach today is to provide the enhancing content via the vertical blanking interval (VBI) of the streaming television content. The VBI is a non-viewable portion of the television signal. In the future, enhancing content may also be provided over satellites (e.g., DVB, DSS, etc.) and as part of digital television (DTV) feeds.

Unfortunately, there remains a significant hurdle concerning creation and distribution of interactive programs. TV programs are typically broadcast as a continuous data stream. Attempting to synchronize the enhancing content, regardless of how that content is delivered (i.e., via the VBI, satellite feeds, etc.), with the streaming content poses a difficult design challenge.

The inventors have developed a system and method that address this challenge.

SUMMARY

This invention concerns a client-server architecture that synchronizes streaming content with enhancing content via pre-announced triggers.

According to one implementation, the architecture includes server-side components that form announcements containing information specifying how and when to receive upcoming triggers. The announcements contain such information as an identification of the sender, a broadcast locator (e.g., URL, channel, frequency, etc.) at which the triggers and enhancing data files are to be broadcast or multicast, a time when the triggers and data files are to be sent, and a protocol used to transmit the triggers and data files. The server transmits the announcements to a general broadcast or multicast IP (Internet Protocol) address.

Client-side components include a listener to monitor the IP address for the announcements and a filter to extract selected ones of the announcements. Selected announcements are stored in an electronic programming guide (EPG) database in correlation with the streaming content programs to indicate that the associated programs are interactive.

When a user tunes to an interactive program, the client opens a container HTML page that contains controls to receive the streaming content program and to extract the announcements from the guide database. One of the controls monitors an IP address at particular times specified by a selected announcement to receive the triggers corresponding to the interactive program.

The server delivers the triggers at times synchronized to the streaming content. When triggers arrive, a client control processes the triggers to coordinate presentation of the enhancing content with the streaming content. This processing may involve invoking one or more scripts in the container page or performing general navigation in the container page.

The client-server architecture also enables delivery of headlines and other data items employed in a ticker using pre-announced and timely broadcast triggers. The data items are carried by the triggers and accumulated into an array. The container page inserts the array into a displayed ticker.

DETAILED DESCRIPTION

This invention concerns an architecture for synchronizing streaming content with enhancing content. The architecture governs announcement of upcoming enhancing content, reception of the enhancing content when it arrives, and association of the enhancing content with the streaming content using triggers The enhancing content consists of a set of data files and triggers that are multicast to a pre-defined network address to cause specific actions or events to occur on any listening client. The triggers are tied to the associated streaming content. The enhancing content can take many forms, including text, images, animated images, audio, hyperlinks, controls, executable code, and so forth. Announcements are sent ahead of the triggers to announce when the triggers will be broadcast and on what multicast address.

Another aspect of this invention concerns a way to receive headlines and other data items as triggers and accumulate them into a ticker.

General Architecture

Figure 1:
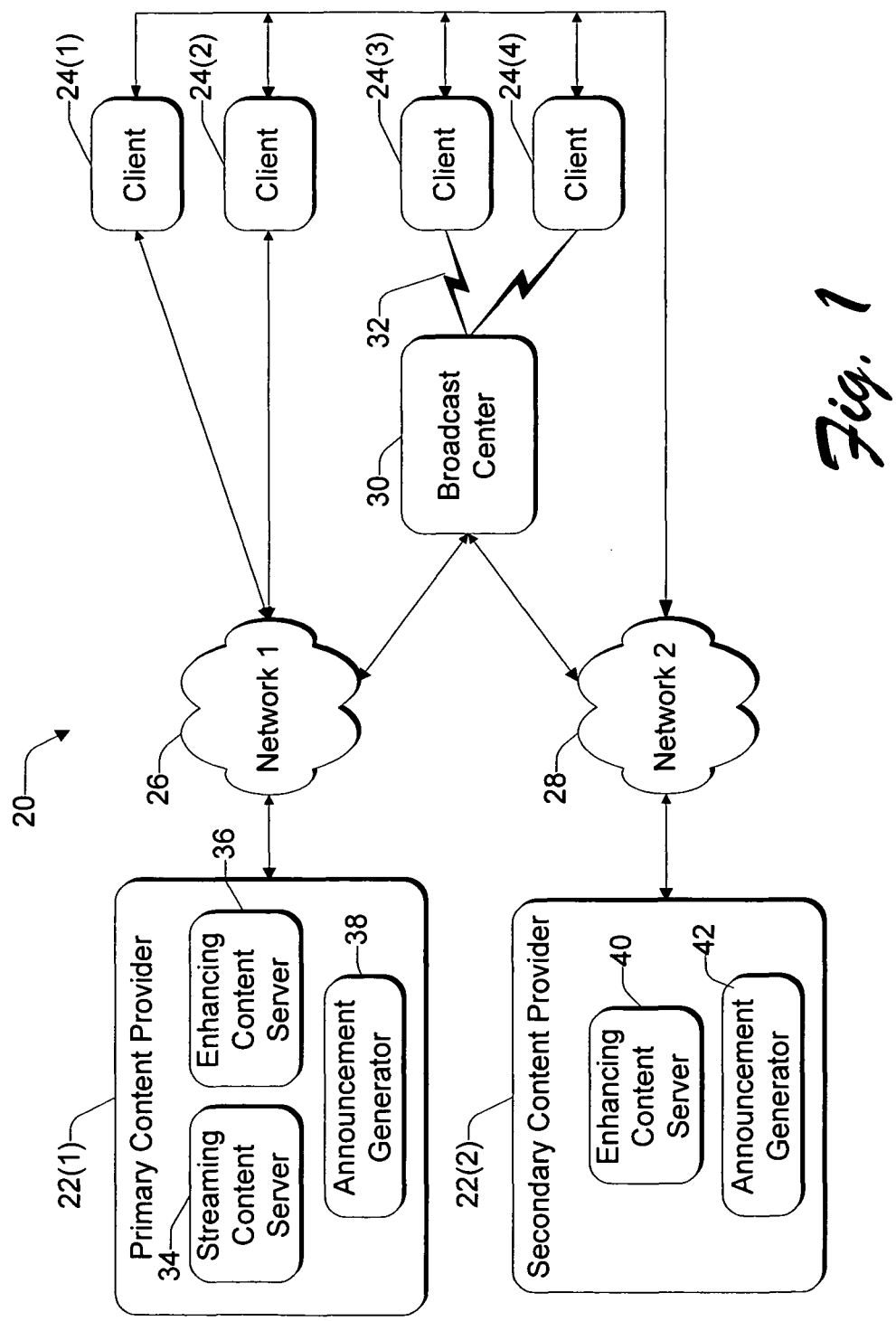
FIG. 1 is a diagrammatic illustration of a client-server architecture for synchronizing streaming content with enhancing content using pre-announced triggers.

FIG. 1 shows an architecture 20 that enables delivery of streaming content and enhancing content from one or more content providers, as represented by a primary content provider 22(1) and a secondary content provider 22(2), to multiple clients 24(1), 24(2), 24(3), and 24(4). The FIG. 1 illustration shows many different ways to deliver streaming and enhancing content. One way is for the same provider to deliver both forms of content directly to the clients over the same distribution network. This situation is represented by content provider 22(1) serving streaming and enhancing content over network 26 to clients 24(1) and 24(2).

Another way is for different providers to deliver the contents separately over the same or different networks. This situation is represented by the primary content provider 22(1) serving streaming content over network 26 to clients 24(1) and 24(2) and the secondary content provider 22(2) serving enhancing content over network 28 to the clients 24(1) and 24(2).

Still another way is for a content provider to deliver its content to an intermediary broadcast center, which broadcasts the content to clients. This third approach is represented by either content provider 22(1) or 22(2) delivering packets to a broadcast center 30, which converts network data packets to broadcast packets and broadcasts the packets over a broadcast medium 32 to clients 24(3) and 24(4).

The networks 26, 28, and 32 represent many diverse types of networks ranging from data networks (e.g., Internet, LAN (local area network), WAN (wide area network), etc.) to television networks (e.g., cable, satellite, RF, microwave, etc.). Technologies used to implement the networks are well known and include such technologies as wire-based technologies (e.g., fiber optic, cable, wire, etc.), wireless technologies (e.g., satellite, RF, etc.), and switching technologies (e.g., ATM (Asynchronous Transfer Mode), Ethernet, etc.). These technologies employ different data communication protocols (e.g., TCP/IP, IPX/SPX, DSS, NABTS, etc.). One specific implementation involves IP over any one of these protocols (e.g., IP/NABTS, IP/DSS, IP/DVB, etc.). For an example of IP/NABTS, please refer to co-pending U.S. patent application Ser. No. 08/726,529, entitled "Method for Sending Computer Network Data As Part Of Vertical Blanking Interval", which was filed Oct. 7, 1996.

The primary content provider 22(1) has a streaming content server 34 to serve streaming content (e.g., video and audio) to the clients. The content may be in many different forms, such as TV programs, movies, animation, music, news, documentaries, educational productions, and the like. As an exemplary implementation, the streaming content server 34 may be implemented as personal computers or workstations running a multitasking, disk-based operating system, such as Windows NT from Microsoft Corporation, that are configured as continuous media file servers that serve data files at a constant data rate. As an alternative to a content server, the primary content provider may be a broadcast headend that broadcasts the primary content (e.g., broadcast or satellite TV).

The primary content provider 22(1) has an enhancing content server 36 to serve supplemental or enhancing content to the clients in order to enhance the streaming content served by the streaming content server 34. The enhancing content could alternatively be stored with the primary content and served before, along with, or after the primary content. For instance, a single server may serve both the primary and enhancing content and record the content onto a storage medium for later transmission.

The enhancing content may be text, graphics, video, pictures, sound, or other multimedia types, as well as applications or other executable code. Examples of enhancing content include trivia questions or games related to the program, advertisements, merchandise or other memorabilia, hyperlinks to similar programs of similar type or starring the same actor/actress, and so on.

In the implementation described herein, the enhancing content is constructed as a hypertext file, or more particularly as an HTML document (or "Web page") which can be rendered by a browser. The HTML document may include links to other target resources that supply even more content. In concept, the target resource can be virtually any type of object—including executable programs, text or multimedia documents, sound clips, audio segments, still images, computers, directories, and other hyperlinks. In most Web pages, hyperlink targets are files that reside on computers connected to the Internet. However, a hyperlink target can also be a particular location within a document, including the document that is currently being rendered, as well as to other files that may be locally stored at the client.

The primary content provider 22(1) also implements an announcement generator 38 that generates and transmits announcements to notify clients of upcoming transmission of enhancing content. Through the announcements, the providers tell the clients what data will be served over the network at a given time and how to find that data.

The secondary content provider 22(2) is similar to the primary content provider 22(1) in that it implements an enhancing content server 40 and an announcement generator 42. These components function essentially as described above with respect to the primary content provider 22(1).

Enhancing Content Stream

The content providers serve both streaming content and enhancing content to the clients. The architecture employs three elements to implement reception and display of enhancing content: announcements, triggers, and data files. The first element is an "announcement" that describes the IP address and port on which corresponding triggers will be sent for a particular enhancement. The second element is a "trigger", which tells the client to perform particular actions (e.g., execute a script). The third element is the "data files", which are either packages containing interactive content files or the interactive content files themselves. Together, these elements form the enhancement stream that is delivered to the client.

Announcements, triggers, and data files are all sent on separate IP addresses/ports. Sending an enhancement stream involves transmitting the following elements:

1. An announcement indicating a trigger address and port.
2. A special trigger indicating an address and port for file transmission.
3. A data file containing interactive content files or individual files.
4. If necessary, a trigger causing the interactive content to be extracted out of a container file.
5. A trigger to cause the interactive content to be displayed.

"Announcements" inform the client that the streaming content, such as a television show, is interactive. The announcements provide details about the enhancements, the show that the content enhances, and the page that contains the enhancement's starting point. More particularly, the announcements include transmission-related information, such as an identification of the sender, a locator (e.g., URL, channel, frequency, etc.) at which the triggers and data files are to be transmitted, a time when the triggers and data files are to be sent, and a protocol used to transmit the triggers and data files. The announcements might further include information pertaining to the content of the transmission, such as a title, a type of content (e.g., sports, science fiction, mystery, action, documentary, audio, graphical, etc.), a subject matter description, a length of transmission, a rating, actor/actress names, and so forth.

Announcements are based on the Internet standard Session Description Protocol (SDP). An announcement is made up simply of lines of text, with identifiers on the left of an equal sign and associated text on the right. An announcement can be stored as a text file until it is ready to be broadcast.

There are several types of enhancement announcements. The most common types are current announcements, which refer to a show that is currently on, and channel announcements, which refer to a given channel. Table 1 illustrates a sample announcement.

TABLE 1

| Example | Description |
| --- | --- |
| v = 0 | SDP Version number, must be 0. |
| o = enhID 2 1 IN IP4 155.55.55.55 | "enhID" specifies a user identifier. "2" is the session identifier. "1" is the version identifier. "155.55.55.55" is replaced with the IP address of the server |
| | transmitting or encoding the content. As a whole this field serves as an identifier for an enhancement. |
| s = Title | Contains the title for the enhancement. |
| c = IN IP4 233.17.43.44/3 | Indicates the IP address on which triggers will be sent. |
| t = 2208988801 2208990601 | Start and finish time for an enhancement. |
| a = EnhID: {9E2E8B20-083E-11d1-898F-00C04FBBDEBC} | Identifies the announcement as an enhancement announcement (as opposed to some other type of announcement). |
| m = data 17832 udp 0 | Specifies the port used for sending triggers. |

"Triggers" are notifications that are sent to clients at specific times during an interactive data stream. Triggers cause an action to occur on a client, such as causing a script to be executed. In this manner, the enhancing content invoked by the triggers is synchronized with the streaming content.

Each type of trigger has a different format. However, all triggers are formatted as strings containing three parts: a key or numerical identifier, the trigger data, and a checksum value. The key is separated from the data by white space, typically a space or tab character. The format of a trigger is as follows:

Key TriggerData[checksum]

where "Key" is the numerical identifier, "TriggerData" is the trigger data, and "checksum" is the checksum value. For example, the following string might be transmitted to the client for a navigation or "Nav" trigger:

"2 bpc://MSNBC/default.htm[BA7E]"

The preceding example illustrates the syntax of the Nav trigger as it is transmitted to a client. This is not the format typically used in writing stream language files. The syntax transmitted to clients contains additional information that you do not need to specify, namely a checksum value and a fully specified Broadcast Architecture URL. The Broadcast Architecture supports several basic types of triggers as shown in Table 2.

TABLE 2

| Key | Name | Description |
| --- | --- | --- |
| 0 | Error | No action is taken. |
| 1 | Data | Receives data using the specified transfer protocol. |
| 2 | Nav | Displays a page. If a target is specified, for example by using a FRAME or DIV tag set, the page is displayed in that target. |
| 3 | Nav | Displays a page. This key value has the same functionality as the previous trigger and has been kept for compatibility with earlier versions. |
| 4 | Script | Runs the specified script. |
| 6-999 | Reserved | Reserved for future use. |

1,000 and up UserTrigger Sends a user-defined trigger event.

Table 3 lists exemplary triggers for the navigation-type, script-type, and data-type triggers specified by the Broadcast Architecture.

TABLE 3

| Trigger Type | Description | Format |
| --- | --- | --- |
| Navigation | | |
| Top Page Navigation | "Home page" for enhancements | "2 <bpc://MyEnhancement/toppage.htm>" |
| Target Navigation | To navigate to a named target | "2 <itv.htm>[targ:LOGO_FRAME]" |
| Script | Execute ECMAScript (Jscript) in the top page | "4 alert('Hi!');" "4 Navigate('VIEW_FRAME', 'http://www.microsoft.com');" |
| Data | | |
| FTS | Starts listening for FTS data | "1 <FTS> 233.17.43.44:2000&MyEnhancement" |
| CAB | Unpacks cabinet (CAB) file | "1 <CAB> bpc://MyEnhancement/toppage.cab" |

Enhancement data files and their dependencies are transmitted to clients using a transfer service. One exemplary service is the File Transfer Service (FTS), which is a component of NetShow, a Microsoft product used for streaming video and data on the Internet and on Intranets using IP Multicast. FTS sends files using a transfer mechanism based on IP multicast that includes forward error correction (FEC). However, other file transfer services might be employed as well. The architecture allows use of different file transfer services as needed.

Enhancement pages, like Web pages, are typically composed of several files. For example, the enhancement file "MyEnh.htm" might contain graphic images in Graphics Interchange Format (GIF) and Joint Photographic Experts Group format (JPEG), ActiveX controls, FutureSplash animations, and other such files that must be downloaded for the enhancement page to display properly. These additional files are referred to as "dependency file" or "dependencies" of the enhancement file.

The enhancement dependency files are stored on the client before the enhancement is displayed. Otherwise, the user may end up viewing an incomplete enhancement and will perceive the content as broken. There are several ways of handling dependencies. One approach is to allocated broadcast bandwidth and repeatedly download the dependency files. Another approach is to require the user to explicitly download the dependency files, either from a Web site or a portable medium.

Still another approach is to package the enhancement and all its dependencies together in a single file. In one implementation, this involves use of cabinet (CAB) files. Packing the enhancement files together with its dependencies ensures that the user receives a complete all-or-nothing viewing experience because they either get it all or nothing, which may be better than getting bits and pieces.

Client System

Clients 24(1)-24(4) can be implemented in a number of ways, including computers that are broadcast enabled, set-top boxes, and computer enhanced television units.

Figure 2:
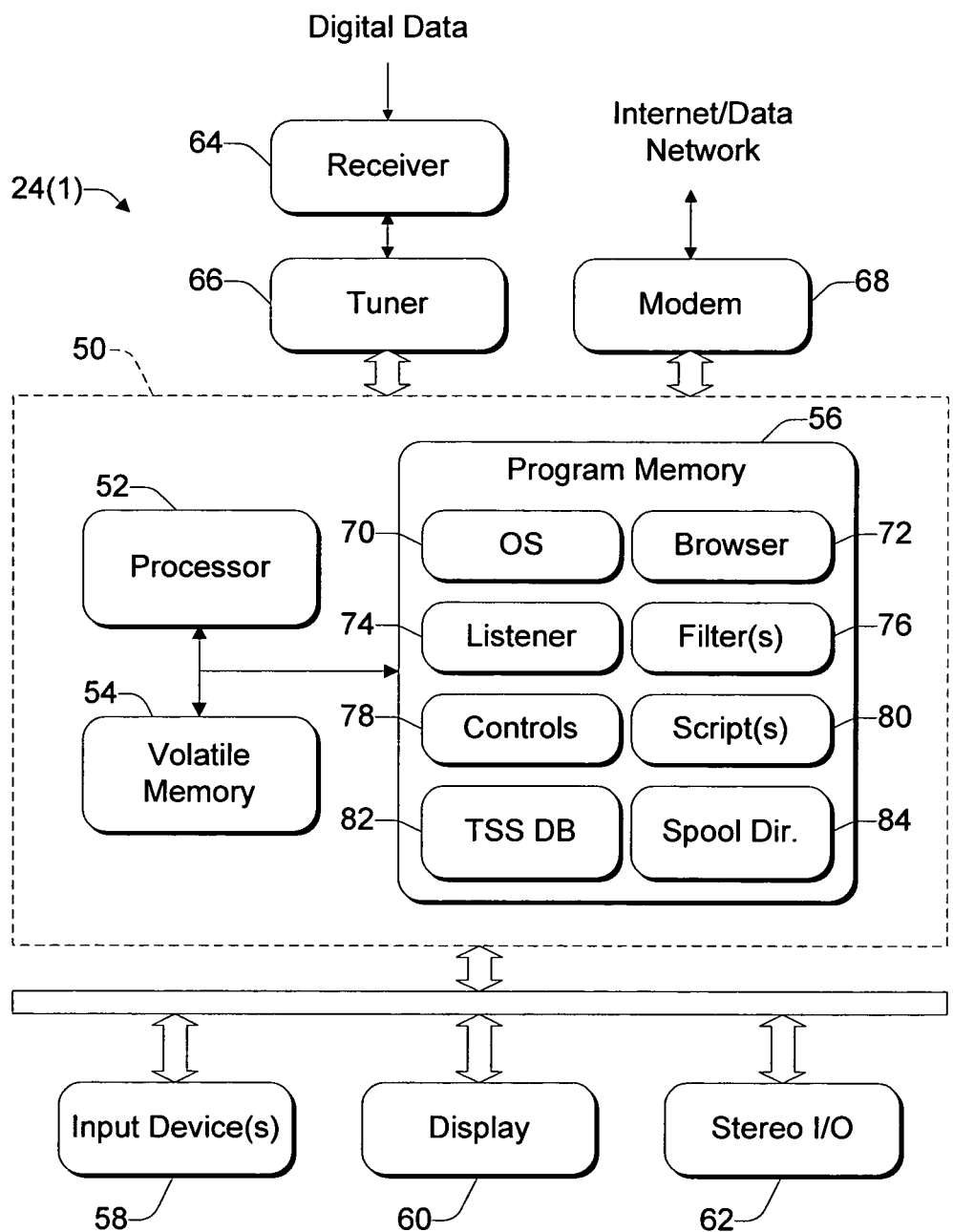
FIG. 2 is a block diagram of an exemplary client computing unit.

FIG. 2 shows an exemplary configuration of a client 24(1) implemented as a broadcast-enabled computer. It includes a central processing unit 50 having a processor 52, volatile memory 54 (e.g., RAM), and program memory 56 (e.g., ROM, disk drive, floppy disk drive, CD-ROM, etc.). The client 24 (1) has one or more input devices 58 (e.g., keyboard, mouse, etc.), a computer display 60 (e.g., VGA, SVGA) to display the video content and enhancing content, and a stereo I/O 62 for interfacing with a stereo system to play audio content.

The client 24(1) includes a digital broadcast receiver 64 (e.g., satellite dish receiver, RF receiver, microwave receiver, network connection, etc.) and a tuner 66 which tunes to frequencies of a broadcast network. The tuner 66 is configured to receive digital broadcast data in a particularized format, such as MPEG-encoded digital video and audio data, as well as digital data in many different forms, including software programs and programming information in the form of data files. The client 24(1) also has a modem 68 that provides access to the Internet or other network. For other implementations, the modem 68 might be replaced by a network card, an RF receiver, or other type of port/receiver.

One example implementation of a broadcast-enabled PC is described in a co-pending U.S. patent application Ser. No. 08/503,055, entitled "Broadcast-Enabled Personal Computer," filed Jan. 29, 1996 in the names of Gabe L. Newell, Dan Newell, Steven J. Fluegel, David S. Byrne, Whitney McCleary, James O. Robarts, Brian K. Moran; William B. McCormick, T. K. Backman, Kenneth J. Birdwell, Joseph S. Robinson, Alonzo Gariepy, Marc W. Whitman, and Larry Brader. This application is assigned to Microsoft Corporation, and is incorporated herein by reference.

The client 24(1) runs an operating system 70 that supports multiple applications. The operating system is preferably a multitasking operating system that allows simultaneous execution of multiple applications. One preferred operating system is a Windows brand operating system sold by Microsoft Corporation, such as Windows 98, Windows CE, or Windows NT or other derivative versions of Windows. It is noted, however, that other operating systems may be employed, such as the Macintosh operating system from Apple Computer, Inc. and the OS/2 operating system from IBM.

The client 24(1) further runs a Web browser 72 that is capable of navigating hyperlinks and receiving and rendering hypermedia content, such as HTML pages. As an alternative to a browser, the client may run a piece of software known as "WebTV for Windows", which is available from Microsoft Corporation.

In addition to the operating system 70 and browser 72, the client 24(1) is illustrated with a number of software programs or modules that can be started or called to receive and play enhancing content in conjunction with streaming content. The modules include an announcement listener 74, one or more filters 76, one or more controls 78, and one or more scripts 80. Listener 74 is a specialized control that operates on information provided by announcements to receive and process triggers. Each program is stored in program memory 56, loaded into volatile memory 54 when launched, and executed on the processor 52. These software components are described below in more detail with reference to FIG. 3.

The client 24(1) also has maintains a TV system services (TSS) database 82 that holds an electronic program guide (EPG) and a spool directory 84 that functions as a cache for the TV based services and to hold the enhancing data files.

Client Software Architecture

Figure 3:
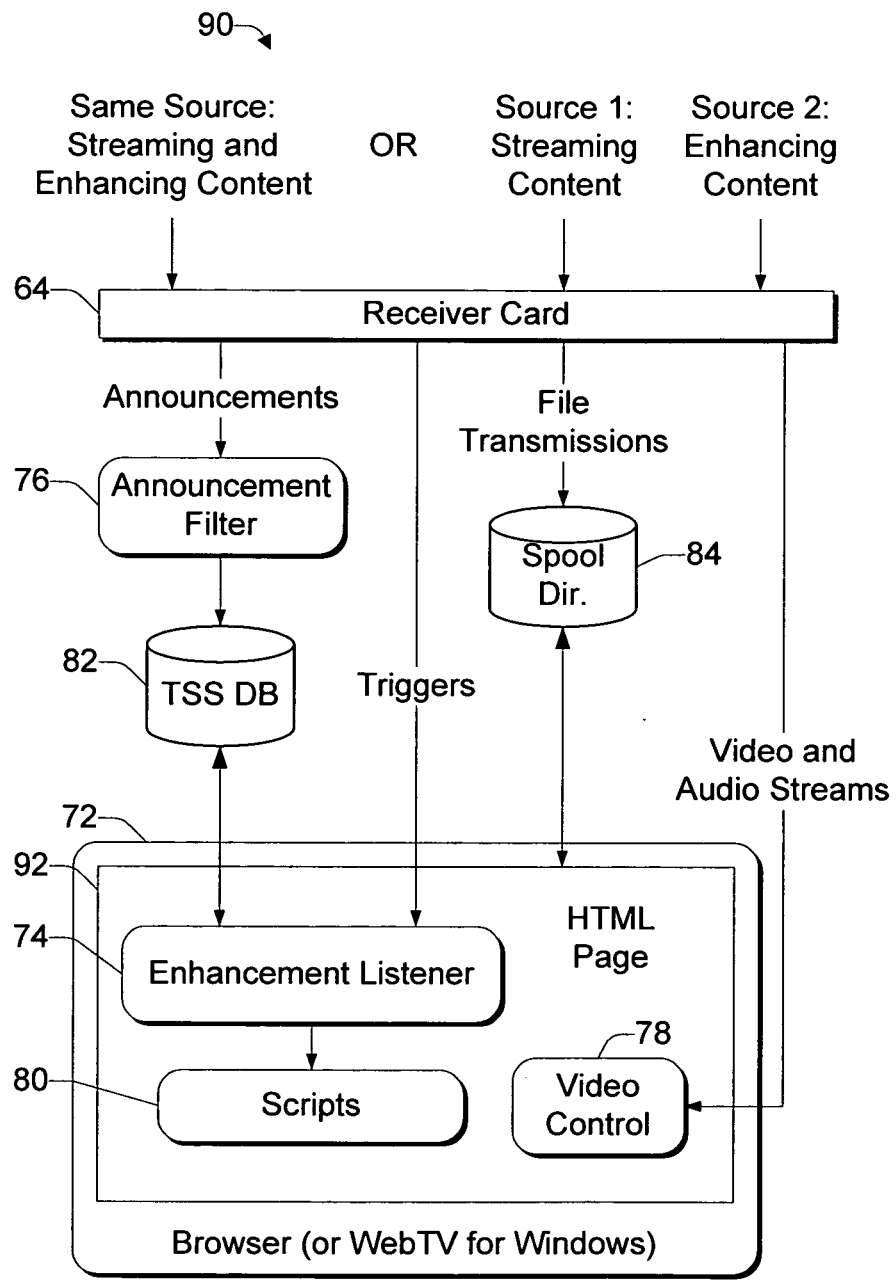
FIG. 3 shows an exemplary configuration of a client software architecture implemented on the client computing unit.

FIG. 3 shows an exemplary configuration of the client software architecture 90. The streaming and enhancing content may arrive at the client in one of two ways. First, a single source (e.g., primary content provider 22(1)) may transmit both the streaming content and the enhancing content in a composite data stream. In traditional television broadcast, the enhancing content is inserted into the VBI. Alternatively, the streaming content may be served from one source (e.g., primary content provider 22(1)) while the enhancing content is served from a second source (e.g., secondary content provider 22(2)).

The enhancing content comprises the three elements: announcements, triggers, and data files. The three elements are sent at different times to different IP addresses and ports. The data files include both the enhancement files and the dependency files.

Receiver 64 receives the composite stream or the dual streams. Receiver 64 represents one or more receiver types, such as a broadcast receiver, a network connection, a cable receiver, and so forth. The receiver extracts the streaming content (e.g., video and audio data) and sends it to one or two types of video controls 78: a video control, which is used in Web pages that are not hosted in WebTV for Windows, and an enhancement video control, which is used in Web pages that are hosted in WebTV for Windows. The video controls reside in an HTML page 92 that is opened by a browser 72 (or the WebTV for Windows software) to support the interactive program.

As video is received by the video control 78, elements of the enhancement stream (announcements, triggers, data files) are received at other components of the client. The enhancement announcements are passed through one or more filters 76, which examine each announcement for a match against a list of programs in which the user is interested, or against other types of predefined rules of acceptance. The filter(s) 76 retain the announcements of interest, and discard the rest.

Selected announcements are stored in the TSS database 82, which also contains program guide information. The announcements are correlated with the video content shows that can be enhanced. In this manner, the presence of enhancement data in conjunction with a show listed in the database indicates that the show is interactive.

Enhancement listener 74 handles the announcements stored in the TSS database 82 when the user requests the corresponding interactive program. The listener 74 uses information from the announcements to prepare to receive triggers. The enhancement listener 74 is implemented as an ActiveX control that responds to enhancement stream events. Like the video controls, the enhancement listener is hosted in an enhancement page 92 displayed by browser 72.

Depending upon the trigger type, the listener 74 may perform several different functions. A data-type trigger is used in facilitating reception of the data files. The data-type trigger contains the IP address and port at which the data files will be delivered. The enhancing data files are temporarily cached in spool directory 84.

A navigation-type trigger is used for navigation about the container HTML page 92. A script-type trigger contains information to invoke one or more scripts 80 for execution. The scripts use the enhancing data stored in the spook directory 84 to enhancing the streaming content being played by the video control 78.

Content Synchronization

Figure 4:
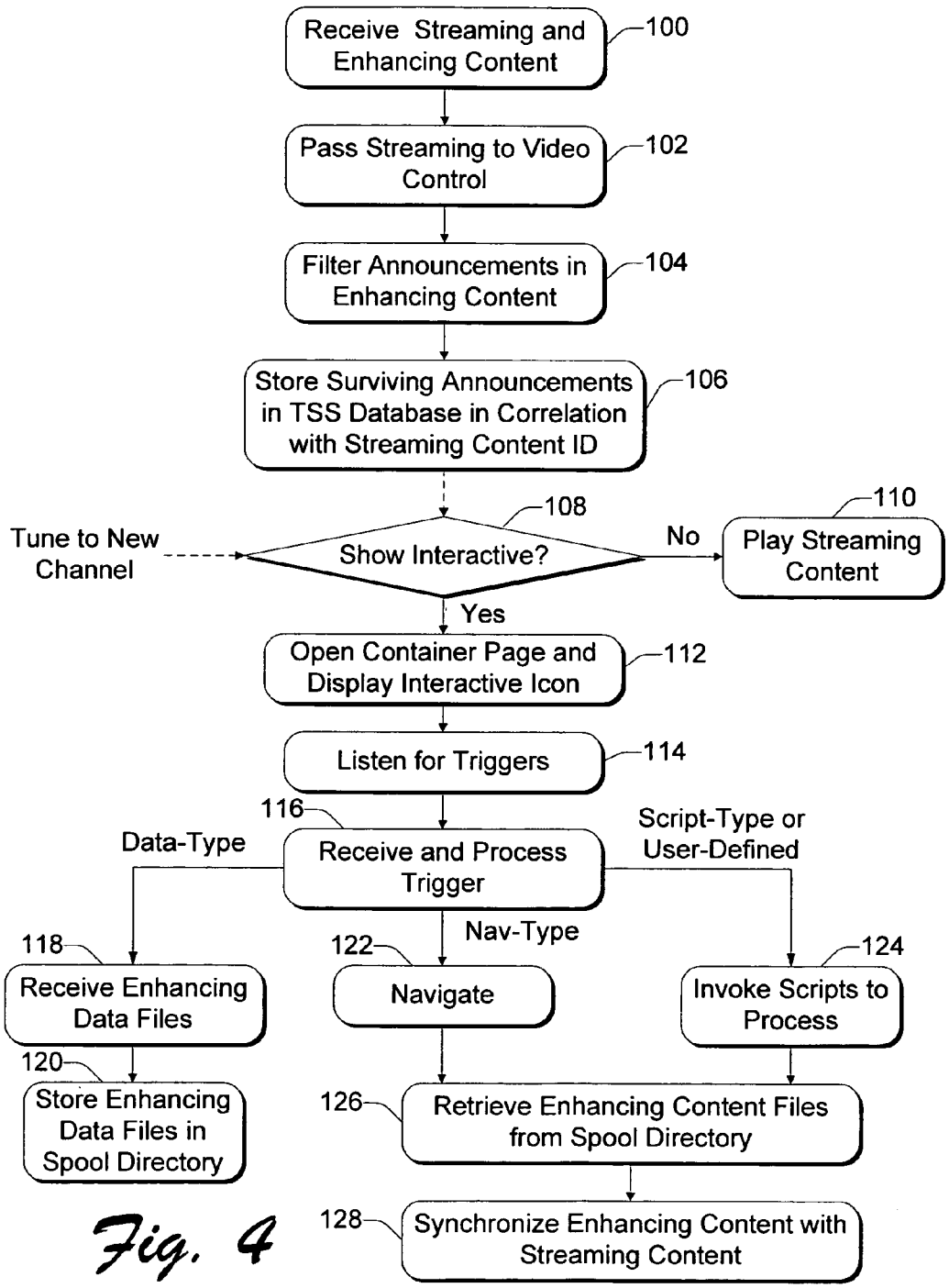
FIG. 4 shows a flow diagram showing steps in a method for synchronizing streaming content with enhancing content through use of announcements and triggers.

FIG. 4 shows exemplary steps in a method for synchronizing streaming content with enhancing content through use of announcements and triggers. At step 100, the client receives streaming and enhancing content from one or more content providers. The receiver passes the streaming content to video control 78 in an HTML page 72 (step 102).

Meanwhile, the enhancement listener 74 executes in the background to listen for announcements that may accompany streaming content. One or more filters 76 register with, and are loaded by, the announcement listener 74 to filter out unwanted announcements received in the enhancing content stream (step 104). At step 106, announcements surviving the filtering process are stored in TSS database 82. The filter 176 calls a loader (e.g., DLL object) to load the announcement in the TSS database. The selected announcements are stored in correlation with the titles or identities of the streaming content programs to indicate that the programs are interactive.

Each time a user tunes a new channel, browser 72 checks the TSS database 82 to see if the new show is interactive (step 108). If not (i.e., the "no" branch from step 108), the client simply plays the streaming content (step 110). On the other hand, if the new show is interactive (i.e., the "yes" branch from step 108) and assuming the user has enhancements enabled, the client browser opens a container HTML page 92 and displays a special icon indicating that the show is interactive (step 112). The container page 92 includes the controls and scripts to render the streaming and enhancing content on the display.

When browser 72 displays an interactive show, the listener 74 listens on the IP address and port specified in an earlier announcement stored in the TSS database 82 (step 114). The announcement listener 74 monitors the IP stream at the address and port for triggers. Triggers are sent at specific times during the associated streaming content to cause an action to occur on a client in relation to the streaming content. In this manner, the enhancing content induced by the triggers is synchronized with the streaming content.

When a trigger is received, the listener 74 processes the trigger (step 116). Part of the processing determines whether the trigger is a standard trigger, such as the Broadcast Architecture defined data-type, navigation-type, and script-type triggers, or a user-defined trigger.

For a data-type trigger, the client is prepared to receive enhancing data files according to a particular protocol (step 118). One example of a data-type trigger, known as the FTS data trigger, indicates a subdirectory in which to store enhancing data files in the spool directory 84 and the IP address and port on which files will be transferred. The FTS data trigger uses a "bpc:" URL syntax to reference delivered files from HTML. The syntax allows for the use of subdirectories. A sample FTS data trigger is given as follows:

1 <FTS>233.43.17.17:17817&MyEnhancement

The enhancing data files are stored in the MyEnhancement subdirectory of the spook directory 84 (step 120). The URL to a referenced HTML page in the MyEnhancement subdirectory is given as follows:

bpc://MyEnhancement/funstuff.htm

For a navigation-type trigger, the browser uses the trigger information to perform general navigation operations, such as moving to a top of page or referencing a target resource (step 122). For a script-type triggers and user-defined triggers, the listener sends an event to the container Web page 92, where they are handled by scripts 80 embedded in that Web page (step 124).

If the triggers involve accessing enhancement data files, the listener 74 uses the URL to retrieve the data files from the spool directory 84 in timely manner (step 126). The browser then renders the enhancing content in synchronization with the streaming content (step 128).

Trigger-Carried Ticker Information

Another aspect of this invention concerns a way to receive headlines and other information as triggers and accumulate them into a ticker. Triggers holding ticker information are accumulated over time and then displayed in a ticker. It also provides a way to have text fade-in and fade-out (using Dynamic HTML or "DHTML").

Figure 5:
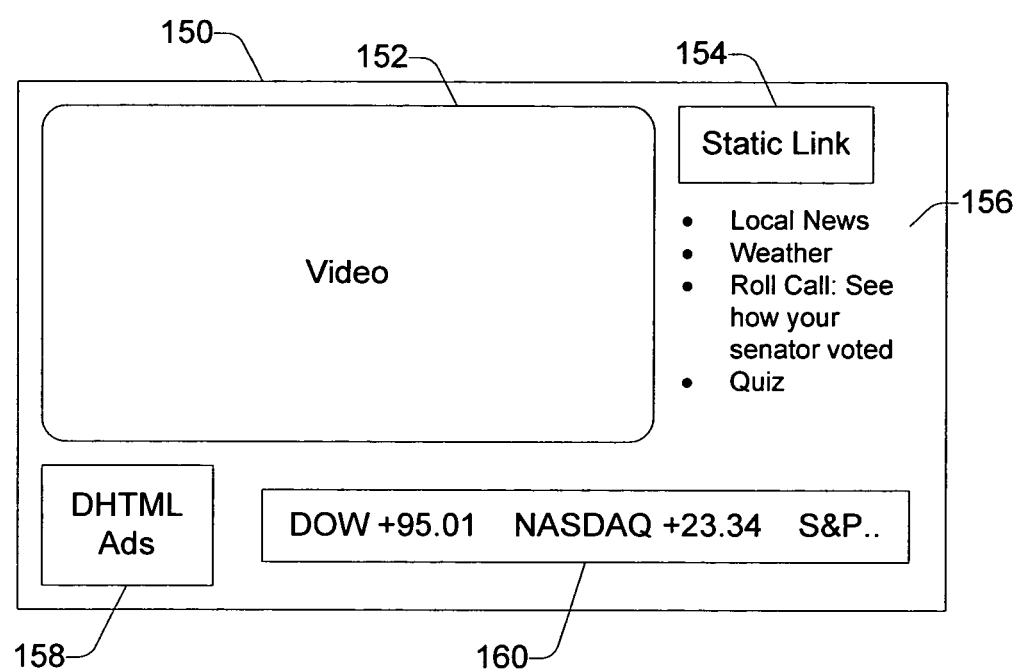
FIG. 5 shows an exemplary HTML page that combines streaming content with enhancing content. It also illustrates use of triggers to carry content for tickers.

To demonstrate this technology, FIG. 5 shows an HTML page 150 for the MSNBC Web site "www.MSNBC.com" that combines and coordinates both streaming content and enhancing content. It includes a video pane 152 within which the streaming video data is played. The MSNBC page 150 also has a static link 154, such as a link to a home page, weather, or local news. Dynamic links 156 are edited and managed on a more routine basis, such as daily or hourly, and hence change more often than the static link 154.

The MSNBC page also has an advertising space 158 to display DHTML pages used to present advertisements. A DHTML ticker 160 is provided to scroll section names, headlines, URLs, schedule information, and so forth.

The MSNBC enhancement page 150 operates as follows:
1. The enhancement page 150 is received and rendered by the browser 72.
2. The enhancement page 150 receives triggers containing headlines and other items for the ticker 160 and stores them as elements in an array. The enhancement page 150 also receives triggers for the dynamic links 156.
3. The page operates on a timer to cycle through all of the stored triggers, fading from one headline to the next.
4. Each headline has an associated Web link (URL); if the user clicks on a headline, a child browser window is created in which the referenced page is displayed.

The ticker data is stored in three arrays defined as follows:

```
// MSNBC Headlines
MSNBC_Category = new MakeArray(40);
MSNBC_URL = new MakeArray(40);
MSNBC_Headline = new MakeArray(40);
```

The array "MSNBC_Category" stores the headline category; "MSNBC_URL" stores the link associated with the headline, and "MSNBC_Headline" stores the actual headline text that is displayed in the ticker. Each array can store up to forty elements corresponding to ticker headlines. The array is initially filled with empty strings. As the ticker cycles through the arrays, it ignores any element that is an empty string. To fill out the arrays and thereby add headlines to the ticker data, the content provider transmits a trigger that calls the following Jscript routine:

```
function ChangeHeadline(tnum,tcat,turl,thl)
{
tnum--;
if(tnum >= 0 && tnum < 40)
  {
  MSNBC_Category[tnum] = tcat;
  MSNBC_URL[tnum] = turl;
  MSNBC_Headline[tnum] = thl;
  }
}
```

The "ChangeHeadline" function inserts the headline "thl" at the array index "tnum". The value specified in "tnum" allows the content producer to order the headlines in a particular fashion. The ticker cycles through the arrays in numeric order, skipping empty array elements.

Here are some examples of triggers that call "ChangeHeadline". Trigger type 4 causes the trigger listener control 74 on the enhancement page to execute the script specified in the trigger.

```
00:00:05.00 trigger 4 (
"top.main.ChangeHeadline(1,'Brian','http://msw','T
est 1 Headline');" ) only;
00:00:10.00 trigger 4 (
"top.main.ChangeHeadline(10,'Seattle','http://msw'
```

-continued

```
,'Test 10 Headline Test 2 Headline Test 2 Headline
Test 2 Headline Test 2 Headline Test 2 Headline
Test 2 Headline Test 2 Headline Test 2
Headline');" ) only;
00:00:15.00 trigger 4 (
"top.main.ChangeHeadline(11,'Seattle','http://msw'
,'Test 11 Headline Test 2 Headline Test 2 Headline
Test 2 Headline Test 2 Headline Test 2 Headline
Test 2 Headline Test 2 Headline Test 2
Headline');" ) only;
```

The following trigger will remove the headline from the array at index 11.

```
00:00:15.00 trigger 4 (
"top.main.ChangeHeadline(11,'','','');" ) only;
```

The following is an excerpt from an actual stream file as generated by the MSNBC tools:

```
bandwidth=38400;
00:00:01.00 trigger 4 (
"top.main.ChangeStanding(0,
'http://www.msnbc.com/news/itv_redir.asp?http://www.
msnbc.com/modules/starr/default.asp',
'Starr's growing web of investigations');" )
only;
00:00:02.00 trigger 4 (
"top.main.ChangeStanding(1,
'http://www.msnbc.com/news/itv_redir.asp?http://www.
msnbc.com/news/180095.asp', 'Sabotage may have
killed U.S. envoy');" ) only;
00:00:03.00 trigger 4 (
"top.main.ChangeStanding(2,
'http://www.msnbc.com/news/itv_redir.asp?http://www.
msnbc.com/modules/clinics/default.asp', 'Clinic
violence, state-by-state');" ) only;
00:00:04.00 trigger 4 (
"top.main.ChangeHeadline(1, '',
'http://www.msnbc.com/news/itv_redir.asp?', '');"
) only;
00:00:05.00 trigger 4 (
"top.main.ChangeHeadline(2,
'Time & Again',
'http://www.msnbc.com/news/itv_redir.asp?/news/TIM
EAGAIN_front.asp', 'JFK's presidential
nomination. Wednesday, July 15 12:00AM');" ) only;
```

CONCLUSION

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

The invention claimed is:

1. A method for synchronizing streaming content with enhancing content, comprising:
receiving, by a computing device, an announcement on a monitored address containing information specifying how and when to receive upcoming enhancing content, the announcements informing a client that the streaming content is interactive, providing details about the corresponding enhancing content, and describing an IP address and port on which corresponding triggers will be sent for a particular enhancement, transmission-related information, and information pertaining to content of the enhancing content;

passing, by the computing device, each announcement through one or more filters to determine whether each announcement is either a match against a list of programs in which a user is interested or is a match against other types of predefined rules of acceptance;

retaining, by the computing device, the announcements of interest and discarding remaining announcements;

receiving, by the computing device, the streaming content which is associated with the enhancing content, the streaming content including:

one or more triggers that notify a client to perform a particular action, each trigger being formatted as a string containing a key or numerical identifier, trigger data, and a checksum value and the one or more triggers containing ticker data associated with the enhanced content; and one or more data files that are either an interactive content file or contain packages containing the interactive content files;

receiving, by the computing device, the enhancing content according to the information contained in the announcement and at a time in synchronization with the streaming content;

enhancing, by the computing device, the streaming content with the enhancing content; and presenting the ticker data contained in the one or more triggers within a ticker and displaying the ticker together with the enhancing content and the streaming content.

2. A method as recited in claim 1, wherein the announcement contains parameters selected from a group comprising: a broadcast locator, a time when the corresponding enhancing content is to be sent, a protocol, an identity of the streaming content that the enhancing content enhances, and a page that contains a starting point for the enhancing content.

3. A method as recited in claim 1,
wherein the data files and the triggers cause operations involving the data files to timely introduce the enhancing content with the streaming content, and
wherein the method further comprises:
receiving the data files; and
receiving the triggers at times in synchronization with the streaming content.

4. A method as recited in claim 3,
wherein the enhancing content further comprises dependency files that contain instructions to present content contained in the data files, and
wherein the method further comprises delivering the data files together with the dependency files in a cabinet (CAB) file format.

5. A method as recited in claim 1, wherein the receiving comprises receiving the streaming content and receiving the enhancing content in a composite stream of one source.

6. A method as recited in claim 1, wherein the receiving comprises:
receiving the streaming content from a first source; and
receiving the enhancing content from a second source different from the first source.

7. A computer-implemented method for synchronizing streaming content with enhancing content, comprising:
forming announcements containing information specifying a first address and a time at which to receive upcoming triggers, the announcements informing a client that the streaming content is interactive, providing details about the corresponding enhancing content, and describing an IP address and port on which the triggers will be sent for a particular enhancement, transmission-related information, and information pertaining to content of the enhancing content, and the triggers notifying the client when the enhancing content can be invoked and notifying the client to perform a particular action, each of the triggers being formatted as a string containing a key or numerical identifier, trigger data, and a checksum value, and the triggers containing ticker data associated with the enhancing content;

sending the announcements by one of broadcast and multicast to a second address;

monitoring the second address to receive the announcements;

passing each announcement through one or more filters to determine whether each announcement is either a match against a list of programs in which a user is interested or is a match against other types of predefined rules of acceptance;

retaining the announcements of interest and discarding remaining announcements;

monitoring the first address at the time specified in the selected announcements to receive the triggers;

processing the triggers to coordinate presentation of the enhancing content with the streaming content, the processing including informing the client to invoke the triggers to access the enhancing content, and the streaming content including one or more data files that are either an interactive content file or contain packages containing the interactive content files; and presenting the ticker data contained in the triggers within a ticker and displaying the ticker together with the enhancing content and the streaming content.

8. A method as recited in claim 7, wherein the forming comprises creating an announcement to contain parameters selected from a group comprising: a broadcast locator, a time when a corresponding trigger is to be broadcast, a broadcast protocol, an identity of the streaming content that the enhancing content enhances, and a page that contains a starting point for the enhancing content.

9. A method as recited in claim 7, wherein the processing comprises receiving the enhancing content according to a predetermined protocol and storing the enhancing content.

10. A method as recited in claim 7, wherein the processing comprises navigating within a container HTML page.

11. A method as recited in claim 7, wherein the processing comprises invoking a script within a container HTML page.

12. A method as recited in claim 7, further comprising sending the enhancing content together with the triggers.

13. A method as recited in claim 7, further comprising delivering the streaming content, the enhancing content, and the triggers from a same source.

14. A method as recited in claim 7, further comprising:
delivering the enhancing content from a first source; and
delivering the streaming content and the triggers from a second source different from the first source.

15. A method as recited in claim 7, further comprising displaying the enhancing content together with the streaming content.

16. A method, comprising:
displaying, by a computing device, streaming content;
monitoring, by the computing device, an announcement address to receive announcements pertaining to enhancing content for enhancing the streaming content, the announcements containing information that specify a trigger address and times at which to receive upcoming triggers, the announcements further informing a client that the streaming content is interactive, providing details about the corresponding enhancing content, and describing an IP address and port on which corresponding triggers will be sent for a particular enhancement, transmission-related information, and information pertaining to content of the enhancing content, and the triggers notifying the client when the enhancing content can be invoked and notifying the client to perform a particular action, each of the triggers being formatted as a string containing a key or numerical identifier, trigger data, and a checksum value and the triggers containing ticker data associated with the enhancing content;

passing, by the computing device, each announcement through one or more filters to determine whether each announcement is either a match against a list of programs in which a user is interested or is a match against other types of predefined rules of acceptance to retain selected announcements;

retaining, by the computing device, the selected announcements and discarding remaining announcements;

storing, by the computing device, the selected announcements;

monitoring, by the computing device, the trigger address at the times specified in the selected announcements to receive corresponding triggers;

processing, by the computing device, the triggers to cause one of the following events to occur: (1) receive one or more data files having the enhancing content, or (2) utilize the enhancing content in the data files to enhance the streaming content, the processing including informing the client to invoke the triggers to access the enhancing content, and the enhancing content including one or more data files that are either an interactive content file or contain packages containing the interactive content files; and presenting the ticker data contained in the triggers within a ticker and displaying the ticker together with the enhancing content and the streaming content.

17. A method as recited in claim 16, further comprising caching the data files.

18. A method as recited in claim 16, further comprising presenting the streaming content and the enhancing content using an HTML page.

19. A method as recited in claim 16, further comprising:
using information from the trigger to invoke a script; and
executing the script to enhance the streaming content.

20. A method, comprising:
monitoring, by a computing device, an IP (Internet Protocol) address to receive triggers in synchronization with a streaming content, wherein enhancing content is associated with the streaming content, the triggers informing a client to invoke the enhancing content and notifying the client to perform a particular action, each of the triggers being formatted as a string containing a key or numerical identifier, trigger data, and a checksum value and the triggers containing ticker data associated with the enhancing content;

receiving, by the computing device, an announcement on a monitored address containing information specifying how and when to receive upcoming enhancing content and describing an IP address and port on which the triggers will be sent for a particular enhancement, transmission-related information, and information pertaining to content of the enhancing content, wherein the enhancing content includes one or more data files that are either an interactive content file or contain packages containing the interactive content files;

passing, by the computing device, each announcement through one or more filters to determine whether each announcement is either a match against a list of programs in which a user is interested or is a match against other types of predefined rules of acceptance;

retaining, by the computing device, the announcements of interest and discarding remaining announcements;

forming, by the computing device, an array of the ticker data received in the triggers; and displaying, by the computing device, the array of the items within the ticker together with the enhancing content and the streaming content.

21. A method as recited in claim 20, further comprising receiving announcements at another IP address, the announcements being used to announce upcoming transmissions of the triggers.

22. A method comprising:
monitoring, by a computing device, an announcement address to receive announcements pertaining to enhancing content for enhancing the streaming content, the announcements containing information that specify a trigger address and a time at which to receive upcoming triggers, the announcements are further to inform a client that the streaming content is interactive, to provide details about the corresponding enhancing content, and to describe an IP address and port on which the triggers will be sent for a particular enhancement, transmission-related information, and information pertaining to content of the enhancing content, and the triggers are to notify the client to perform a particular action, each of the triggers being formatted as a string containing a key or numerical identifier, trigger data, and a checksum value and the triggers containing ticker data associated with the enhancing content;

passing, by the computing device, each announcement through one or more filters to determine whether each announcement is either a match against a list of programs in which a user is interested or is a match against other types of predefined rules of acceptance to retain selected announcements;

retaining, by the computing device, the selected announcements and discarding remaining announcements;

monitoring, by the computing device, the trigger IP address at the time specified in one of the selected announcements to receive a corresponding trigger;

processing, by the computing device, the trigger to cause utilization of the enhancing content to enhance the streaming content, to process the trigger is further to inform the client to invoke the trigger to access the enhancing content, wherein the enhancing content includes one or more data files that are either an interactive content file or contain packages containing the interactive content files; and presenting the ticker data contained in the triggers within a ticker and display the ticker together with the enhancing content and the streaming content.

23. A system comprising:
memory;
one or more processors;
one or more modules stored in the memory and executable by the one or more processors to:
monitor an IP address to receive enhancing content, wherein the enhancing content is received according to instructions contained in an announcement, and wherein the enhancing content comprises triggers, each trigger containing at least one item, the announcements are further to inform a client that the streaming content is interactive, to provide details about the corresponding enhancing content, and to describe an IP address and port on which the triggers will be sent for a particular enhancement, transmission-related information, and information pertaining to content of the enhancing content, and the triggers are to notify the client when the enhancing content can be invoked and to notify the client to perform a particular action, each of the triggers being formatted as a string containing a key or numerical identifier, trigger data, and a checksum value and the triggers containing ticker data associated with the enhancing data, wherein the enhancing content includes one or more data files that are either an interactive content file or contain packages containing the interactive content files;

present a ticker that contains the ticker data together with the enhancing content and the streaming content;

pass each announcement through one or more filters to determine whether each announcement is either a match against a list of programs in which a user is interested or is a match against other types of predefined rules of acceptance; and retain the announcements of interest and discard remaining announcements.

24. A system for synchronizing streaming content with enhancing content, comprising:
at least one content server;
a client;
the content server being configured to form announcements that contain information specifying an IP address and a time at which to receive upcoming triggers, the content server sending the announcements by at least one of broadcasting and multicasting to the client, the announcements are further to inform the client that the streaming content is interactive, to provide details about the corresponding enhancing content, and to describe an IP address and port on which the triggers will be sent for a particular enhancement, transmission-related information, and information pertaining to content of the enhancing content; and
the client being configured to receive the announcements and monitor the IP address at the time specified in the announcements to receive the triggers, the client processing the triggers to coordinate presentation of the enhancing content with the streaming content, the processing is further to inform the client to invoke the trigger to access the enhancing content, each of the triggers being formatted as a string containing a key or numerical identifier, trigger data, and a checksum value and the triggers containing ticker data associated with the enhancing content, and the enhancing content including one or more data files that are either an interactive content file or contain packages containing the interactive content files,
wherein the client is further configured to:
pass each announcement through one or more filters to determine whether each announcement is either a match against a list of programs in which a user is interested or is a match against other types of predefined rules of acceptance;
retain the announcements of interest and discard remaining announcements; and
present the ticker data contained in the triggers within a ticker and display the ticker together with the enhancing content and the streaming content.

25. A system as recited in claim 24, wherein the announcements contain parameters selected from a group comprising: a broadcast locator, a time when a corresponding trigger is to be broadcast, a broadcast protocol, an identity of the streaming content that the enhancing content enhances, and a page that contains a starting point for the enhancing content.

26. A system as recited in claim 24, wherein the client receives the enhancing content according to a predetermined protocol and caches the enhancing content.

27. A system as recited in claim 24, wherein the client uses information from the trigger to navigate within a container HTML page.

28. A system as recited in claim 24, wherein the client uses information from the trigger to invoke a script within a container HTML page.

29. A system as recited in claim 24, wherein the content server delivers the streaming content, the enhancing content, and the triggers.

30. A system as recited in claim 24, wherein the content server delivers the enhancing content and the triggers, and further comprising a second content server to deliver the streaming content.

31. A client architecture, comprising:
a video control of a computing device to play video content on a display device;
a listener of the computing device to monitor an announcement IP (Internet Protocol) address to receive, from a server, announcements pertaining to enhancing content for enhancing the video content, the announcements containing information that specify a trigger IP address and times at which to receive upcoming triggers, the announcements are further to inform the listener that the video content is interactive, to provide details about the corresponding enhancing content, and to describe an IP address and port on which the triggers will be sent for a particular enhancement, transmission-related information, and information pertaining to content of the enhancing content, and the enhancing content includes one or more data files that are either an interactive content file or contain packages containing the interactive content files;
the listener further monitoring the trigger IP address at the times specified by the announcements to receive corresponding triggers; and
a rendering component of the computing device to present the video content on the display device and to enhance the video content with the enhancing content according to instructions received in the triggers, the triggers are further to inform the listener to invoke the triggers to access the enhancing content, each of the triggers being formatted as a string containing a key or numerical identifier, trigger data, and a checksum value and the triggers containing ticker data associated with the enhancing content, the rendering component further configured to present the ticker data in a ticker and display the ticker together with the enhancing content and the streaming content,
wherein each announcement is passed through one or more filters to determine whether each announcement is either a match against a list of programs in which a user is interested or is a match against other types of predefined rules of acceptance, retaining the announcements of interest and discarding the remaining announcements.

32. A client architecture as recited in claim 31, further comprising a storage to hold the announcements in correlation with an identity of the video content.

33. A client architecture as recited in claim 31, further comprising a cache to hold the enhancing content.

34. A client architecture as recited in claim 31, wherein the listener and video control are contained within an HTML page rendered by the rendering component.

35. A client architecture as recited in claim 34, wherein the HTML page also has one or more scripts to process the instructions contained in the triggers.

* * * * *